(12) United States Patent  
Lepoutre

(10) Patent No.: US 6,237,642 B1  
(45) Date of Patent: May 29, 2001

(54) SEALING-TIGHT PIPE WITH ACOUSTIC DAMPING FOR THE TRANSPORT OF GASEOUS FLUIDS, AND A METHOD OF PRODUCING THE SAME

(75) Inventor: Henri Lepoutre, Roubaix (FR)

(73) Assignee: Westaflex-Automobile (FR)

( * ) Notice: Subject to any disclaimer, the term of this patent is extended or adjusted under 35 U.S.C. 154(b) by 0 days.

(21) Appl. No.: 09/260,153

(22) Filed: Mar. 1, 1999

(30) Foreign Application Priority Data

Mar. 5, 1998 (FR) .................................................. 98 02681

(51) Int. Cl.⁷ ....................................................... F16L 11/04
(52) U.S. Cl. ......................... 138/129; 138/137; 138/148; 138/154; 181/196; 181/224
(58) Field of Search ..................................... 138/125, 129, 138/137, 148, 153, 154, 28, 30; 181/196, 224, 248, 252, 256

(56) References Cited

U.S. PATENT DOCUMENTS

| | | | |
|---|---|---|---|
| 2,486,387 | * 11/1949 | Bringolf | 138/133 |
| 3,063,470 | * 11/1962 | Forster | 138/30 |
| 3,374,856 | 3/1968 | Wirt | 181/42 |
| 3,554,237 | * 1/1971 | Pelley et al. | 138/129 |
| 3,605,815 | * 9/1971 | Von Forell | 138/30 |
| 3,625,242 | * 12/1971 | Ostwald | 138/30 |
| 3,642,034 | * 2/1972 | Ullman et al. | 138/129 |
| 3,674,056 | 7/1972 | D-Aprile | 138/134 |
| 3,739,815 | * 6/1973 | Rejeski | 138/129 |
| 3,941,032 | * 3/1976 | Clerk | 138/30 |
| 4,304,266 | * 12/1981 | Kutnyak | 138/122 |
| 4,432,393 | * 2/1984 | Mills | 138/30 |
| 4,452,280 | * 6/1984 | Werner | 138/131 |
| 4,732,176 | * 3/1988 | Sugimura | 138/30 |
| 5,416,270 | * 5/1995 | Kanao | 138/129 |
| 5,526,849 | * 6/1996 | Gray | 138/134 |
| 5,548,093 | * 8/1996 | Sato et al. | 138/121 |
| 5,778,941 | * 7/1998 | Inada | 138/129 |
| 5,954,096 | * 9/1999 | Lepoutre | 138/142 |

FOREIGN PATENT DOCUMENTS

| | | | |
|---|---|---|---|
| 44 45 794 C1 | 1/1996 | (DE) | G10K/11/16 |
| 0 342 802 A3 | 11/1989 | (EP) | F16L/55/02 |

* cited by examiner

Primary Examiner—James Hook  
(74) Attorney, Agent, or Firm—Renner, Kenner, Greive, Bobak, Taylor & Weber

(57) ABSTRACT

A sealing-tight pipe with acoustic damping for the transport of gaseous fluids, inter alia for the admission of air for combustion into a motor vehicle heat engine, characterised in that it comprises a first layer 1 of a porous material which is permeable to the gaseous fluids and a second layer 4 consisting of a thin film, attached to the first layer but not adhering thereto, of a flexible fluid-tight material which is mechanically deformable reversibly.

14 Claims, 1 Drawing Sheet

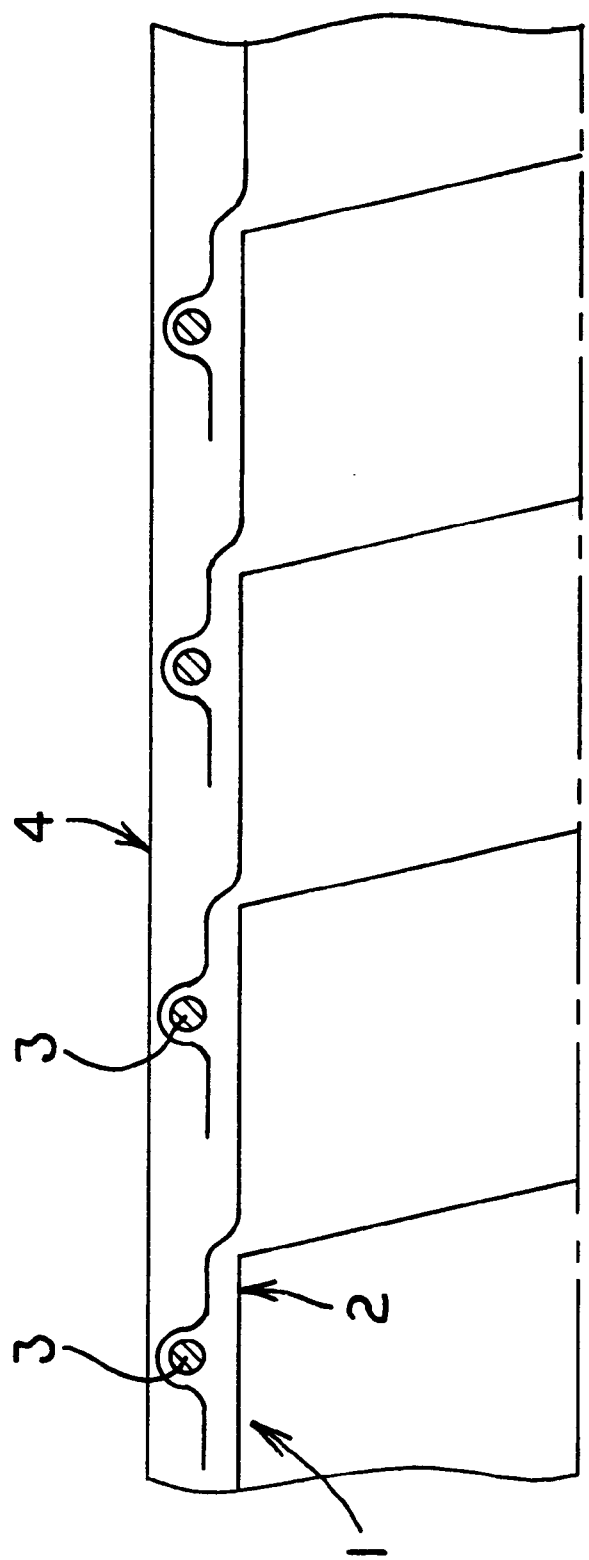

SEALING-TIGHT PIPE WITH ACOUSTIC DAMPING FOR THE TRANSPORT OF GASEOUS FLUIDS, AND A METHOD OF PRODUCING THE SAME

TECHNICAL FIELD

This invention relates to sealing-tight pipes for the transport of gaseous fluids. Amongst such pipes, the invention relates to those which are of the type having acoustic damping, i.e. they have the property of attenuating the noise level generated by resonance of the stream of gaseous fluid at each of its own nodes.

The invention is applied preferably, although without limiting force, to the use of this pipe for admission of air for combustion into a motor vehicle heat engine. In this specific applicatior, it is well known that it is important not only not to allow any penetration of liquid, inter alia water, inside the pipe carrying the air for combustion, but also to limit as far as possible the noise generated by the stream of gaseous fluid itself as a result of its natural resonances.

The object of the invention is to provide a pipe of this kind which has excellent acoustic damping properties and which is of simple and hence relatively uncomplicated structure.

DISCLOSURE OF THE INVENTION

To this end, the pipe according to the invention is characterised in that it comprises a first layer of a porous material permeable to the gaseous fluids and a second layer consisting of a thin film attached to the first layer and not adhering thereto, of a flexible fluid-tight material which is mechanically deformable reversibly.

Preferably, the second layer is an outer layer, so that an additional energy dissipation can be obtained by the vibrations of the gaseous fluid through the first porous inner layer. Also, because the two layers are not connected, the second layer, which has no rigidity, can therefore be kept in a position which is fixed by the first layer which, itself, can be rigidified to a varying degree.

However, in some applications it is also possible for the second layer to be an inner layer.

The material constituting the second layer is preferably of the visco-elastic type so that optimal acoustic damping is obtained, in co-operation with the porous nature of he first layer, which actively participates in the damping due to its porous nature creating a pressure loss.

This material of he second layer can be polyurethane, a polyolefin, e.g. polypropylene, PVC, or an elastomer, e.g. latex of the nitrile or neoprene type.

Advantageously, the material of the first layer is fibrous or formed by an open-cell foam.

In manner known per se the first layer can be formed by helical winding of a strip of porous material on itself, the helix turns preferably partially overlapping.

To gave the pipe good radial rigidity, it is possible to interpose a helical reinforcing filament, e.g. of metal or plastic, between the overlapping turn parts.

The second layer preferably is in the form of a tube in one piece, i.e. it is not wound helically.

For its assembly on the first layer the second layer is joined to the latter only at points, e.g. at the ends of the pipe.

The Invention also relates to a specific method of producing this pipe.

According to this method, it comprises making the first layer at least partly from thermofusible fibres, and heating and subjecting the assembly of the two layers to deformation so that, on cooling, the thermofusible fibres, on the one hand, bond to one another and to the other fibres, and on the other hand the second layer, by plastic deformation, assumes the final shape of the first layer without adhering.

For example, the first layer is based on polyester and contains about 20% by weight of copolyester fibres having a melting point of about 140° C., the remainder being polyester fibres having a melting point of about 200° C.

BRIEF DESCRIPTION OF THE DRAWING

The invention will be more readily understood from the following description with reference to the accompanying drawing which forms part of the description and of which the single FIGURE is a diagrammatic axial section of part of a pipe made according to one preferred embodiment of the invention.

PREFERRED EMBODIMENT FOR CARRYING OUT THE INVENTION

The pipe according to the invention comprises a first layer 1 of a porous and in fact very porous material permeable to gaseous fluids. The layer 1, which may be coated or non-coated, is for example based on polyester fibres and, in the example illustrated, it is made by helically winding on itself a strip 2 of porous material, for example a few centimetres in width. The turns of the helix partially overlap and are connected to one another in the overlap zone.

In known manner it is possible to interpose between the overlapping turn parts a helical reinforcing filament 3, for example of metal or plastic material, inter alia polyester, said filament being left free to slide relative to the turns or being connected thereto.

According to the invention, the pipe additionally comprises a second layer 4 consisting of a thin film which is attached to the first layer 1 and which does not adhere thereto, i.e. it is free at least radially relative to the layer 1. The said second layer 4 is of a flexible fluid-tight material which is mechanically deformable reversibly.

Preferably, as shown in the drawing, the second layer 4 externally covers the first layer 1 in such a manner as to form an outer layer. In certain applications, however, it is possible for the said second layer 4 to be an inner layer.

Said second layer 4 has the physical property of reversibly undergoing mechanical deformation so that, as a result of this reversible deformation, it can absorb the acoustic energy which would otherwise manifest itself in the form of nose.

In the preferred embodiment illustrated, the vibrating air carried by the pipe partly traverses the porous inner layer 1 and will essentially subject the outer layer 4 to radial deformation, thus losing its vibrational energy.

This damping property of the layer 4 is further reinforced if, according to one advantageous feature of the invention, the said layer is made of a material of the visco-elastic type. It will be recalled that in contrast to an elastic material core which, before the "plastic" zone is reached (the plastic zone is reached if there is a residual deformation with respect to the initial state when the stress is removed), there is a biunivocal, or unique, relationship between the deformation and the stress, a visco-elastic material has the property of having a deformation curve against the applied stress in the form of a closed hysteresis loop. In other words, this means that in a stress/deformation diagram the path or curve followed by the operating point on the "return", i.e. on the decrease of the applied force, is not superimposed on the path or curve followed on the "outward journey", i.e. on the increase in the applied force, but is delayer (hysteresis) with respect to this outward curve, the two curves nevertheless rejoining at the starting point, i.e. when the applied force is zero. The internal area of the hysteresis loop represents the amount of vibrational or acoustic energy which has been absorbed by the visco-elastic deformation of the material. This area increases all the more with an abrupt change of the direction of deformation and increasing speed. In this way the resonances of the stream of air defined by the wall of the pipe are damped.

The angle formed between the two tangents of the two "outward" and "return" curves rejoining at the starting point is defined as δ. It will be considered here that a material is visco-elastic if tan δ is greater than or equal to 0.1.

For example, the material of the second layer 4 may consist of polyurethane, a polyolefin, e.g. polypropylene, PVC, or an elastomer, e.g. latex of the nitrile or neoprene type.

Preferably, inter alia because the second layer 4 is free with respect to the first layer 1, said layer 4 consists of a tube in one piece which forms a kind of sleeve. Nevertheless, the second layer 4 is joined at points to the first layer 1, for example only at the ends of the pipe, inter alia at the pipe fitting connections.

The invention also relates to a specific method of manufacturing the above pipe.

According to this method, the first layer 1 is made at least partly from thermofusible fibres, and the assembly consisting of the two layers 1 and 4 is heated and subject to deformation so that on cooling the thermofusible fibres on the one hand bond to one another and to the other fibres to form a kind of framework or skeleton, and on the other hand the second layer, by plastic deformation, assumes the final shape of the first layer without adhering.

For example, the first layer 1 is based on polyester and comprises about 20% by weight of copolyester fibres having a melting point of about 140° C., the remainder being polyester fibres having a melting point of about 200° C.

Thus with this method it is possible to subject an initial composite pipe, for example a cylindrical pipe of constant circular cross-section, to deformation as required in order to give it, by limited deformation, a different shape, the second layer 4 faithfully assuming this new shape to provide the acoustic damping function.

Of course the invention is not limited to the embodiment which has been described. On the contrary, various alternatives are feasible without thereby departing from the scope of the invention.

What is claimed is:

1. A sealing-tight pipe with acoustic damping for the transport of gaseous fluids, comprising a first layer of a porous material permeable to the gaseous fluids, and a second layer in the form of a thin film, said second layer being attached to but substantially radially moveable relative to said first layer, said second layer being of a flexible fluid-tight material which is mechanically deformable reversibly, the material of said second layer being of the visco-elastic type.

2. A pipe according to claim 1, wherein the second layer is an outer layer.

3. A pipe according to claim 1, wherein the second layer is an inner layer.

4. A pipe according to claim 1, wherein the material of the second layer is selected from the group consisting of polyurethane, polyolefins, polyvinylchloride and elastomers selected from the group consisting of a latex of nitrile or neoprene.

5. A pipe according to claim 4, wherein the second layer is an outer layer.

6. A pipe according to claim 4, wherein the second layer is an inner layer.

7. A pipe according to claim 1, wherein the material of the first layer is selected from the group consisting of fibrous materials and open-cell foams.

8. A pipe according to claim 1, wherein the first layer is made by helically winding a strip of porous material on itself.

9. A pipe according to claim 8, wherein a helical reinforcing filament is interposed between the overlapping turn parts.

10. A pipe according to any one of claim 1, wherein the second layer is in the form of a one piece tube.

11. A pipe according to claim 1, wherein the second layer is joined to the first layer only at points.

12. A pipe according to claim 11 wherein the points are at the ends of the pipe.

13. A method of manufacturing the pipe of claim 1, comprising the steps of making the first layer at least partly from thermofusible fibers, and heating and subjecting the assembly of the two layers to deformation so that, on cooling, the thermofusible fibers, on the one hand, bond to one another and to the other fibers, and on the other hand the second layer, by plastic deformation, assumes the final shape of the first layer without adhering.

14. A method according to claim 13, wherein the first layer is based on polyester and contains about 20% by weight of copolyester fibers having a melting point of about 140° C., the remainder being polyester fibers having a melting point of about 200° C.

\* \* \* \* \*